(12) United States Patent
Buese (10) Patent No.: US 10,722,814 B2
(45) Date of Patent: Jul. 28, 2020

(54) CONTINUOUS EXTRACTION UNIT AND DOUBLE PHASE CHANGE HEAT EXCHANGER AND METHOD FOR CONTINUOUS EXTRACTION

(71) Applicant: BREVETS, LLC, Lewes, DE (US)

(72) Inventor: Mark A. Buese, Fleming Island, FL (US)

(73) Assignee: BREVETS, LLC, Lewes, DE (US)

(*) Notice: Subject to any disclaimer, the term of this patent is extended or adjusted under 35 U.S.C. 154(b) by 0 days.

(21) Appl. No.: 16/487,302

(22) PCT Filed: Feb. 20, 2018

(86) PCT No.: PCT/US2018/018813
§ 371 (c)(1),
(2) Date: Aug. 20, 2019

(87) PCT Pub. No.: WO2018/152528
PCT Pub. Date: Aug. 23, 2018

(65) Prior Publication Data
US 2020/0054963 A1 Feb. 20, 2020

Related U.S. Application Data

(60) Provisional application No. 62/461,074, filed on Feb. 20, 2017.

(51) Int. Cl.
*B01D 11/02* (2006.01)
*C11B 1/10* (2006.01)
*F28D 7/02* (2006.01)

(52) U.S. Cl.
CPC ...... *B01D 11/0207* (2013.01); *B01D 11/0219* (2013.01); *B01D 11/0284* (2013.01);
(Continued)

(58) Field of Classification Search
CPC ... B01D 11/00; B01D 11/027; B01D 11/0219; B01D 11/0284; B01D 11/0296; C11B 1/10; F28D 7/00; F28D 7/024
See application file for complete search history.

(56) References Cited

U.S. PATENT DOCUMENTS

| 4,278,012 A | 7/1981 | Wheldon et al. |
| 2014/0163247 A1* | 6/2014 | Buese ............... B01D 11/0207 554/8 |

(Continued)

*Primary Examiner* — Yate' K Cutliff
(74) *Attorney, Agent, or Firm* — Saliwanchik, Lloyd & Eisenschenk (57) ABSTRACT

Continuous extraction units (CEUs) are constructed that allow switching of extraction chambers (ECs) that contain extractable material (EM) and extract solution. Extraction chambers can be removable and replaceable, where the CEU has a fluid flow portion and a liquid transfer portion. Quick-connect valves allow exchange of ECs in the CEU while under flow without solvent loss. Alternatively, the CEU employs pairs of ECs where a first EC at equilibrium partitioning of an extract solution drains to an expansion chamber (EXC) with an expansion valve (EV) and a heat transfer tube situated proximal to or shared with a solvent condenser (SC) to form of a double phase change heat exchanger (HE). Solvent from the SC fills a paired EC containing EM. A second pair of ECs has a first EC with EM and solvent establishing equilibrium and a second EC that is emptied of spent EM, filled with fresh EM, and readied to receive solvent.

20 Claims, 6 Drawing Sheets

(52) U.S. Cl.
CPC ............ *B01D 11/0296* (2013.01); *C11B 1/10* (2013.01); *F28D 7/024* (2013.01)

(56) References Cited

U.S. PATENT DOCUMENTS

2016/0303490 A1  10/2016  Ellis
2017/0240841 A1   8/2017  Ellis

\* cited by examiner

CONTINUOUS EXTRACTION UNIT AND DOUBLE PHASE CHANGE HEAT EXCHANGER AND METHOD FOR CONTINUOUS EXTRACTION

CROSS-REFERENCE TO A RELATED APPLICATIONS

This application is the U.S. national stage application of International patent application No. PCT/US2018/018813, filed Feb. 20, 2018, which claims the benefit of U.S. Provisional Application Ser. No. 62/461,074, filed Feb. 20, 2017, the disclosures of which are hereby incorporated by reference in their entireties, including all figures, tables and drawings.

BACKGROUND OF THE INVENTION

The extraction process has been used for centuries for the isolation of desirable materials, primarily from plant matter. The process involves the mixing of a solvent with extractable material, separation of the solution that is formed, and removal of the solvent from the solute, a desired material.

U.S. Pat. No. 9,242,189 to Buese et al. disclosed a continuous extraction unit that employs two or more removable and replaceable extraction chambers to allow retention of the extraction solvent in the unit without requiring stoppage of flow and can allow extract removal with a nearly constant rate when a multiplicity of extraction chambers are employed. The unit employs a heat exchanger that is a combined condenser and an expansion chamber where an expansion valve promotes vaporization and separation of a liquid solute extract and gaseous solvent in a single unit.

A method where extraction chamber that allows liquid transfer of a solvent from an extraction chamber that has depleted extractable material to another extraction chamber containing fresh extractable material absent the solvent can be carried out in a rapid or continuous manner is desirable. A method of extracting using these extraction chambers to allow establishment of a partitioning of extract from the extractable material to a solvent to equilibrium within a freshly charged extraction chamber can occur over a period of time that minimizes the time in which the extraction chambers must reside in the flow of the continuous extraction unit to extract and remove all extract is desirable. A double phase change heat exchanger, where condensation of a gas to liquid occurs in one portion of the heat exchanger and evaporation of a liquid to gas with a liquid-gas separation of extract from a solvent occurs rapidly is desirable.

BRIEF SUMMARY OF THE INVENTION

An embodiment of the invention is directed to a continuous extraction unit (CEU) having at least one compressor, wherein at least one first compressor situated to provide fluid flow in a fluid flow portion of the CEU, a multiplicity of extraction chambers (ECs) with quick-disconnect valves at the inlets and outlets. At least two ECs containing extractable material EM and are within a fluid flow portion of the CEU. The quick-disconnect valves permit disconnecting and removing a first EC containing depleted EM and an extract solution in a dilute state from the fluid flow portion while under flow and connecting a second EC containing EM and the extract solution in a concentrated state under flow without loss of fluid. A liquid transfer portion of the CEU has an EC removed from the fluid flow portion and a third EC containing fresh EM and under vacuum. By connecting these two ECs by a first conduit between the outlet of an elevated first EC to the quick-disconnect valve at the inlet of the third EC and a second conduit between the quick-disconnect valve at the outlet of the third EC to the quick-disconnect valve at the inlet of the first EC so that the solvent from the first EC drains to the third EC, converting it into a second EC to be returned to the fluid flow portion. Residual solvent gas from the drained first EC can be transferred into the fluid flow portion or to a vessel to return it the fluid flow portion.

The CEU can have a double phase change heat exchanger (HE) that comprises a condenser (SC) and an expansion chamber (EXC) with a heat transfer tube that is proximal to or shared with the SC and has an expansion valve (EV) situated at the top of the heat transfer tube to deliver the extract solution to the entire circumference of the heat transfer tube and a gas outlet path within the EXC that promotes liquid-gas separation by structures for coalescence of an aerosol and separation of the solvent gas from the concentrating extract solution. The EV has an adjustable or fixed orifice.

The (CEU) can have a valve connected to a port connected to a source of a second solvent that is essentially non-volatile at the pressure and temperature of the EXC such that no solids problem can arise in the EXC during use of the CEU. The CEU can have an information processor interfaced with at least one actuator and/or at least one sensor. The information processor can be a programmed computer and the sensors can be one or more flow meters, fluid density sensors, refractive index detectors, infra-red, visible or ultraviolet light detectors, and/or conductivity detectors; and the actuators can be one or more valves, pumps, and/or alarms. The sensor can be a Coriolis flow meter.

An embodiment of the invention is directed to the double phase change heat exchanger (HE) that includes a SC and where the EXC has a heat transfer tube proximal to or shared with the SC with an EV situated at the top of the heat transfer tube to deliver the extract solution to the entire circumference of the heat transfer tube. The EXC has a gas outlet path that promotes liquid-gas separation by structures for coalescence of an aerosol and separation of the solvent gas from the extract solution and the extract concentrated from the extract solution. The EV has an adjustable orifice or a fixed orifice. The SC can be coiled tubing proximal to the heat transfer tube or of the EXC or the SC is tubular with an outer containment tube and shares the heat transfer tube of the EXC as the inner surface of the SC and the outer surface of the EXC. The EV can have an orifice that is rectangular or oval in shape with a long dimension perpendicular to the circumference of the heat transfer tube and parallel to the length of the heat transfer tube where the gas outlet path at the exit of the EV induces a spiral flow of the extract solution due to the spiral geometry above the EV. The EV can be a disc with an outer circumference that is 95 to 99.9 percent of an inner circumference of the heat transfer tube such that solution is discharged between the outer circumference of the disc and the inner circumference of the heat transfer tube. The outer circumference of the EV disc can be featureless for a direct downward discharge of the solution along the inner circumference of the heat exchange tube or can be grooved for induction of a spiral flow of solution along the inner circumference of the heat exchange tube. The gas outlet path within the EXC can be defined by a gas deflection tube within and parallel to the heat transfer tube to direct gas and aerosol downward before it can rise to the outlet through the center of the tube. The heat transfer tube can have a decorated surface to increase the heat transfer tube's surface area. The decoration can be an accordion like series of groves, a series of close packed trigonal pyramids, a series of close packed square pyramids, a series of close packed hexagonal pyramids, a series of close packed hemi-spheres or any combination thereof.

Another embodiment of the invention is directed to a method of extraction where the CEU is as described above. Fluid flow induced by the compressor delivers extract solution from the first ECs into the EXC that separates the solvent as a gas from the extract solution in the EXC and directs the gaseous solvent to the inlet of the compressors with the hot compressed gaseous solvent delivered to the SC and to the first ECs. Spent first ECs are replaced with second ECs and the spent EC is placed in liquid transfer portion where it is connected to the third EC and the liquid solvent transferred from the spent first EC to the third EC to form a second EC, which is stationed for placement into the fluid flow portion of the CEU. Residual solvent is transferred as a gas from the liquid transfer portion and spent first EC, followed by disconnection of the spent EC which is emptied and filled with fresh EM and placed under vacuum to become a third EC.

Another embodiment of the invention is directed to a CEU having a compressor for provide fluid flow in the CEU and a multiplicity of extraction chambers (ECs) configured in pairs. The first EC of the first pair of the ECs comprise extractable material (EM) and a concentrated extract solution and a second EC of the first pair of the ECs comprises EM, where the first EC of the first pair of ECs is positioned for fluid flow to the first EC of the first pair of ECs. A second pair of ECs has a first EC of the second pair containing EM and an extract solution and a second EC of the second pair with the EM or in a state of removing the EM that is depleted of the extract and replacing with EM that is fresh. The method employs double phase change heat exchanger (HE) as described above. It is connected to receive the extract solution from the first EC of the first pair of ECs at the EXC and output extract as a neat or concentrated solution, output the solvent as a gas to a compressor, and input the solvent from the compressor to the SC and output the solvent from the SC to the second EC of the first pair of ECs. A first three-way valve is positioned and switchable between a first and second position where the first position is to drain a of the first ECs of the first pair of ECs with isolation of the first ECs of the second pair of ECs and a second position for transforming the first ECs of the second pair of ECs into the first ECs of the first pair of ECs after completion of draining. A second three-way valve is positioned and switchable between a first and second position where the first position is to fill the second ECs of the first pair of ECs with the solvent from the compressor with isolation of the second ECs of the second pair of ECs and a second position for transforming the second ECs of the second pair of ECs into a second ECs of the first pair of ECs upon completion of draining. A third three-way valve positioned and switchable between a first and second position where the first position is a closed position during the draining of the first ECs of the first pair of ECs and the second position is open between the first ECs of the first pair of ECs and a compressor to remove the solvent residual in the first ECs of the first pair of ECs after effectively completion of draining. The CEU has a pump or a valve for continuously or periodically removing the extract from the EXC without disruption of the fluid flow.

Another embodiment of the invention is a method of extraction using the CEU described above. Where a con-centrated extract solution is drained from the first EC of the first pair of the ECs to the EXC and solvent is delivered from SC into the second EC of the first pair of the ECs. The solvent is separated as a gas from the extract solution in the EXC and switching the three-way valves to select the pair of ECs that flow through the EXC and allow the solvent to be removed from a spent first EC of the first pair of the ECs. After complete draining between a first pair of ECs, valves are switched to transform the first ECs of the second pair of ECs into a first ECs of the first pair of ECs, to transform the second ECs of the second pair of ECs into a first ECs of the first pair of ECs, and to remove solvent residual in the first ECs of the first pair of ECs to form a solvent free EC with spent EM. The second EC of the first pair of ECs is disconnected and is paired with the solvent free EC with spent EC and connected as the first EC of the second pair of EC. The solvent free EC with spent EM is disconnected and connected it as the second EC of the second pair of ECs. The spent EM form the second EC of the second pair of EC is removed and refilled with fresh material. The extract from the EXC is removed with least one pump or a valve at the base of the EXC in a continuous or periodic manner.

DETAILED DESCRIPTION OF THE INVENTION

Embodiments of the invention are directed to a CEU system where EC are filled with solvent outside of the flow portion of the CEU and the freshly charged EC can come to an extracts partitioning equilibrium between the EM and the solvent. The CEU comprises a multiplicity of ECs with at least two positions for the ECs to deliver solution into the fluid flow path of the CEU with at least one of these ECs under fluid flow. The EM can be plant material or any other extractable material that, generally, but not necessarily, can be handled as a solid. Sludge or liquid can be adapted for use in the CEU. The EM is referenced to as plant material herein, but, although plant material is a typical EM for use in the CEU, it is to be understood that other EM can be employed, for example, animal, soil, or other mineral matter. The CEU employs an EXC, which is an expansion chamber with an expansion valve, where a solvent from a solution is vaporized, with the generation of a gas, generally, but not necessarily, with the formation of an aerosol from a liquid surface of the solution from which an extract ultimately consolidates into a consolidated extract comprising at least one component that was one or more solutes in the extract solution. The ECs are independently: in a state of having EM being extracted by a solvent, wherein the desired extract is a solute of a solution that is formed; in a state of being washed of residual solute and solution residing in the vicinity of the EM; in a state of being removed from the flow and substituted or replaced with an equivalent EC containing fresh EM and solvent under extraction; and in a state of removal of residual solvent from extracted (spent) EM and its delivery to an EC being prepared for placement into the flow of the CEU by the transfer of the liquid solvent from the spent EC to an EC that contains fresh EM, which can be under vacuum or at least partially filled with solvent. In this manner the solvent is retained in the CEU where a portion of the unit is an EC that are filled with solvent and EM that is in a state of or establishing a thermodynamic equilibrium of the extract between the EM and solution before being introduced into the flow portion of the CEU to transfer the solution into the EXC of the HE.

The CEU retains nearly all solvent within the system with almost no solvent loss to the environment. The CEU allows the continuous removal of the extract, and because a multiplicity of ECs is employed, the rate of extract isolation and removal can be effectively constant when the fresh EM has effectively the same amount of extractable material therein. The extraction process is carried out in a manner where energy consumption is minimized, spent plant material is easily and safely disposed of as waste or employed as a useful by-product, and all other material is recycled solvent or the desired extract.

Figure 1A:
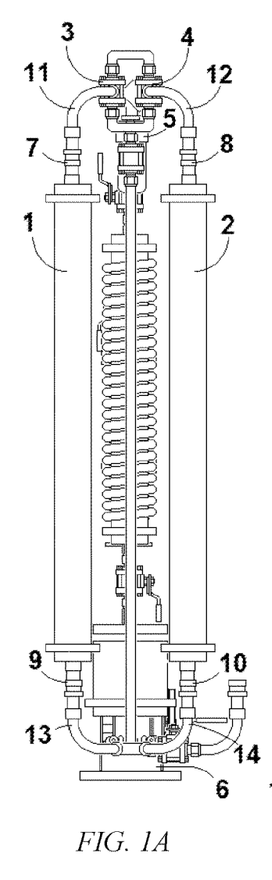
FIG. 1A shows a drawing of a fluid flow portion of a CEU with a double phase change HE with a combined a coiled tube SC with an internal tubular EXC, according to an embodiment of the invention, a with a plurality of liquid filled ECs with quick-disconnect valves at the inlet and outlet of the ECs to allow removing and replacing of liquid filled ECs according to an embodiment of the invention.
Figure 1B:
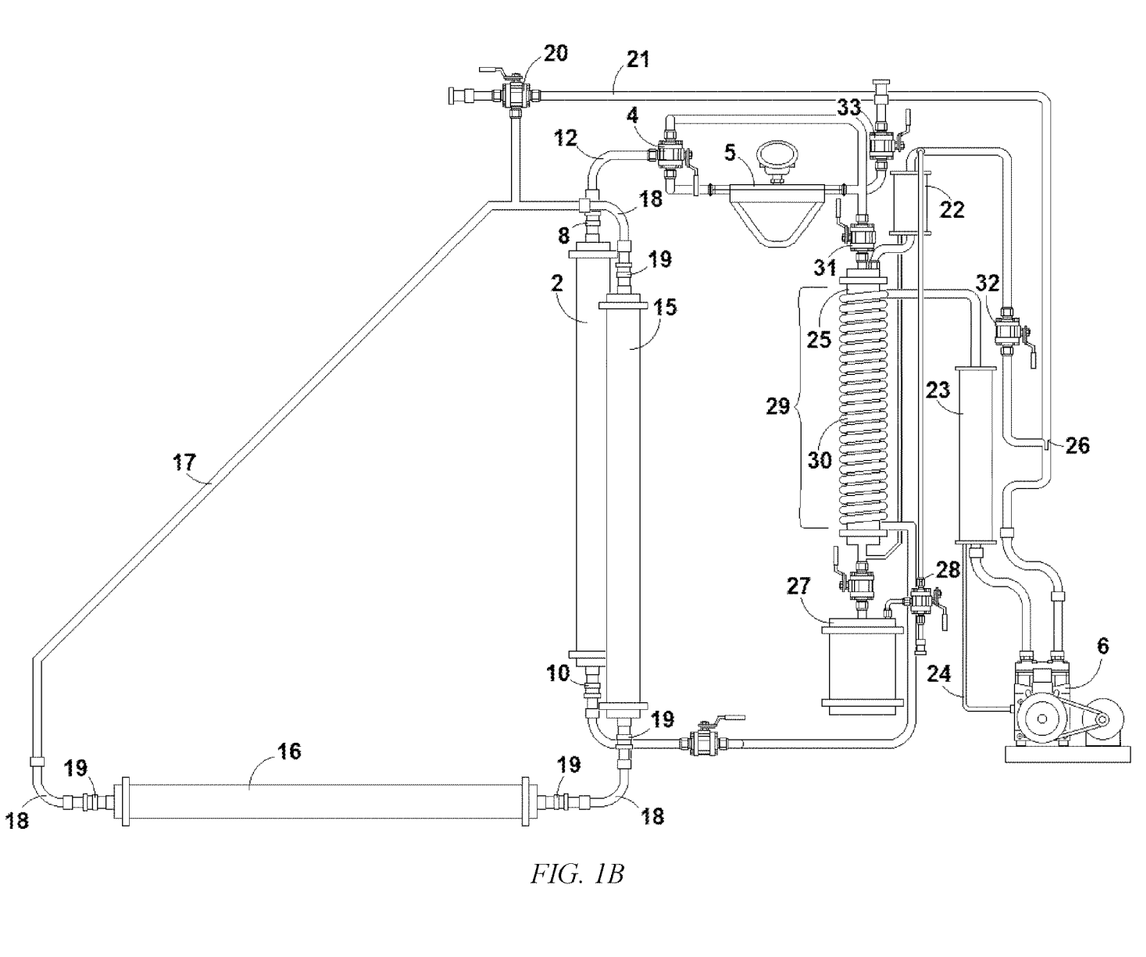
FIG. 1B shows of a CEU displaying a second side of the fluid flow portion of FIG. 1A and a liquid transfer portion for transferring solvent or solution from an extract depleted EC to an EC with fresh EM, according to an embodiment of the invention.

In an embodiment of the invention, four extraction chambers are illustrated in FIGS. 1A and 1B, with two shown in FIG. 1A in positions or sites that can be in the fluid flow of the CEU to introduce solution to the EXC and, as shown in FIG. 1B, with two ECs in a solvent exchange station of the system. Although four are shown, to assure nearly constant extract production, the CEU should employ 5, 6, 7, 8, 9, 10, 11, 12, 13, 14, 15, 16, 17, 18, 19, 20 or more extraction chambers where at least two within the flow portion of the extraction unit and at least one is in a state of having a solution for introduction to the flow portion of the CEU, at least one in a state of being filled with EM, being evacuate of air, or being in a state of solvent transfer from an EC with spent EM, and at least one fresh EC with fresh EM and solvent is positioned such that it may be inserted into the CEU immediately after removal of a spent EC.

In addition to those components illustrated in FIG. 1, in embodiments of the invention, as desired, connectors, for example, quick release connectors can be included within the system. Additionally, as desired, filters, heaters, chillers, cooling baths, heat exchangers, sampling ports, solvent input ports, level indicators, shutoff valves, isolation valves, flow meters, temperature gauges, and sensors for fluid analysis can be included in the system. In addition to the redundancy of ECs, a redundancy of conduits, filters, liquid pumps, receivers, separation chambers, HEs, SCs, EXCs and vacuum pumps can be included in the system, as is readily appreciated by those skilled in the art. The system can be automated by interfacing fluid sensors, pressure sensors, temperature sensors, density sensors, level indicators, valves, pumps, heaters, and chillers to a computer with programmed of technician inputted parameters for control of the system. The extraction plant can employ a plurality of these systems, where, for example, a common solvent receiver, gas source, vacuum source, and product receiver may be shared, as desired, between pluralities of systems. The extraction chambers are of a size that can be readily removed and replaced by one or more technicians, as needed, without, or with, the aid of equipment such as forklifts, jacks and/or other mechanical equipment, as can be appreciated by those skilled in the art. All conduits, filters, gauges, pumps, or other components can be plumbed to permit their emptying and evacuation for exchange without stopping the continuous extraction system. The extraction chambers can be jacketed and can have a heating or cooling fluid circulated through the jacket.

Solvents that can be used include water, alcohols, hydrocarbons, ethers, fluorinated or other halogenated hydrocarbons, esters, amines, carboxylic acids or any other solvents that are readily vaporized at temperatures of about 25° C. to about 250° C. at a pressure from about 760 mm Hg to about 1 mm Hg. Among the solvents that can be used include, but are not limited to, acetaldehyde, diethyl ether, pentane, ethyl bromide, methylene chloride, carbon disulfide, cyclopentane, acetone, methyl acetate, chloroform, methanol, tetrahydrofuran, hexane, carbon tetrachloride, ethyl acetate, ethanol, benzene, cyclohexane, propanol, ethylene dichloride, heptane, dioxane, water, formic acid, toluene, butanol, octane, ethylene bromide, acetic acid, chlorobenzene, propionic acid, xylene, nonane, bromobenzene, turpentine, furfurol, butyric acid, dimethyl formamide, dimethyl acetamide, dimethyl sulfoxide, decane, phenol, aniline, propylene glycol, ethylene glycol, acetonitrile, pyridine, or any other solvent. Depending on the solvent employed, the unit can be constructed out of metal, glass, ceramic, or plastic. Depending on the use of the extract produced, the solvent should be carefully considered for the effect of any residual amounts of solvent may affect the appropriateness of its use. Mixtures of solvents may be employed, for example a mixture of solvents with similar volatilities or in a composition where they form an azeotrope.

Solvents that can be used in a CEU, include hydrocarbons, ethers, fluorinated or other halogenated hydrocarbons, esters, amines, or any other solvents that are readily vaporized at the above ambient operating temperatures and pressures. Mixtures of solvents may be employed, for example a mixture of solvents with similar volatilities or in a composition where they form an azeotrope. Solvents that can be used are freons, for example, but not limited to, trifluoromethane, difluoromethane, fluoromethane, pentafluoroethane, pentafluorodimethyl ether, 1,1,2,2-tetrafluoroethane, 1,1,1,2-tetrafluoroethane, Bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, 1,1,2,2,3-pentafluoropropane, pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, 1,1,3-trifluoropropane, 1,1,1,3,3-pentafluorobutane, 1,3-difluoropropane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,3-trifluoropropane, 1,3-difluoropropane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 3,3,4,4,5,5,6,6,6-nonafluoro-1-hexene, 1,1,2,2,3-pentafluoropropane, 1,1,1,3,3-pentafluoropropane, 1,1,3-trifluoropropane, 1,1,3-trifluoropropane, 1,3-difluoropropane, 2-(difluoromethyl)-1,1,1,2,3,3-hexafluoropropane, 1,1,2,2,3,3,4,4-octafluorobutane, 1,1,1,2,2,4-hexafluorobutane, 1,1,1,3,3-pentafluorobutane, 1,1-difluorobutane, 1,3-difluoro-2-methylpropane, 1,2-difluoro-2-methylpropane, 1,2-difluorobutane, 1,3-difluorobutane, 1,4-difluorobutane, 2,3-difluorobutane, 1,1,1,2,3,3,4,4-octafluoro-2-(trifluoromethyl)butane, 1,1,1,2,2,3,3,4,4,5,5-undecafluoropentane, 1,1,1,2,2,3,4,5,5,5-decafluoropentane, 1,1,1,2,2,3,3,5,5,5-decafluoropentane, 1,1,1,4,4,4-hexafluoro-2-(trifluoromethyl)butane, 1,1,1-trifluoropentane, 1,1,1-trifluoro-3-methylbutane, 1,1-difluoropentane, 1,2-difluoropentane, 2,2-difluoropentane, 1,1,1-trifluorohexane, 1,1,1,2,2,3,3,4,4,5,5,6,6-tridecafluorohexane, 1,1,1,2,2,5,5,5-octafluoro-4-(trifluoromethyl)pentane, 1,1,2,2-tetrafluorocyclobutane, 3,3,4,4,5,5,6,6,6-nonafluoro-1-hexene, 1,1,1-trifluoroethane, pentafluoroethane, or any mixture thereof. Although the continuous extraction system is designed as an effectively closed system, some will be concerned due to the "global warming potential" (GWP) of the solvent. Those with such concerns can use, for example, HFC-41 (fluoromethane) (GWP=92), HFC-152a (1,1-difluoroethane) (GWP=124), HFC-152 (1,2-difluoroethane) (GWP=53), HFC-161 (fluoroethane) (GWP=12), HFO-1234yf (2,3,3,3-Tetrafluoropropene) (GWP=4), HFO-1234ze (trans-1,3,3,3-tetrafluoroprop-1-ene) (GWP=6), or other low GWP solvents. In other embodiments of the invention, the solvent can be a non-freon, such as methyl ether, butane, propane, ammonia, or sulfur dioxide.

The compressor can be of any design, including, but not limited to, piston driven reciprocating compressor, rotary vane, diaphragm, scroll, and roots compressors. The compressor can be one that requires oil or is oil-free. If oil is employed in the compressor, the oil can be of any type, including, but not limited to, hydrocarbon, fluorocarbon or silicone oil. Natural oils can be employed, for example, but not limited to coconut oil, olive oil, or other vegetable or seed oils. The system can be used with pressures that are higher than normal air pressure, 14.7 psi. For example, the low-pressure side of the compressor may be 20 to 100 psi and the high-pressure side of the compressor may be 50 to 200 psi. Materials of construction for the extraction unit are those, which may contain pressures in excess of the highest pressure of the system. For example, metal or metal alloys are useful materials of construction, although other materials, including plastics, may be used when they are capable of withstanding the moderately high pressures of the system.

FIG. 1A shows a face of a CEU with two ECs (1, 2) plumbed into the flow portion of the system, and shows a pair of switching valves (3,4) at the top outlet of the ECs such that selectively one or both ECs can have flow directed through a Coriolis flow meter (5). In this manner the state of the flow induced by a compressor (6) and extent of extraction can be monitored. The ECs have quick-disconnect valves (7, 8, 9, 10) on the ECs that can be connected into the flow with conduits (11, 12, 13, 14) that are flexible pressure tubes such that disconnection while the unit remains under flow at pressure can occur readily. The quick disconnect valves comprise a male and female connection where both contain a check valve or the pair of couplings faun a butterfly like matched discs coupling. The quick disconnects can be, but are not limited to, flat face, ball face, dry link, or any other type of coupling that allows the rapid and effectively leak free connection and disconnection. Other types of valves can be employed for such disconnects with the requirement of very low fluid loss during disconnect. Clamping devices can be used to aid in connection of the quick-disconnect valves under pressure. Typical losses of less than 50 microliters can be achieved with such valves. The CEU can be filled with a solvent via a port that is illustrated on the lower left of the drawing. FIG. 1B shows the side view of the CEU that also includes a portion for CEU where the transfer of liquid solvent from an EC with spent EM (15), recently removed from the solvent flow portion, that is mounted vertically and connected to an EC with fresh EM (16), which was evacuated, positioned horizontally below the EC with spent EM (15). Although the conduits between the two ECs are shown as a non-flexible conduit (17) with flexible conduits (18) at quick-disconnect valves (19), the entire conduits can be flexible hoses to allow the movement of one or both of 15 and 16 during the transfer of solvent and the lengths and relative lengths of the conduit can vary to facilitate handling. The operation for fluid transfer between these ECs of the CEU is disclosed in more detail, below.

In FIG. 1B the portion of the CEU for rapid transfer of solvent allows 16 which has been filled with fresh EM to be placed under vacuum when quick-disconnect valves 19 to 15 are disconnected and three-way valve 20 is positioned to allow a vacuum pump (not shown) to be connected to the CEU. Upon closing three-way valve 20 and reconnecting quick-disconnect valves 19 to 15 the solvent in 15 is transferred quickly by gravity and the pressure differential to evacuated 16. The temperature in 16 can be reduced to below ambient by placing a coolant on or about 16, however, allowing 16 to return to ambient temperature to allow the contents to be in a state where a significant pressure build to the closed 16 subsequent to disconnection is a safe practice. When the lengths of 18 are sufficiently long, 16 can be tilted to expedite complete liquid filling of 16. In general, when the EM in 16 is equal to, greater than, or less than that placed in 15 when the proportion of extractable components in the EM is greater than the difference in the quantity of EM in 15 and 16 the amount of solvent and possibly some extract solute in 15 will exceed the available volume in 16. The solvent and possibly some extract are drained from 15, where the exit 19 is lower than the distal vapor entrance 19, into 16. Manipulation of 16 to fill completely with liquid can be carried out before disconnecting both of its quick-disconnect valves 19 attached to 19. Any remaining solvent liquid or gas in 15, 17, and flexible conduits 18 can be evaporated to the intake of compressor 6 through conduit (21) by proper aligning 20. The insertion 26 from the outlet of 21 allows the fluid flowing from the EXC of HE (25) to the intake of 6 promotes a Venturi effect that can reduce the pressure to 21 and, in turn to 15 and the portion for CEU where the transfer of liquid solvent absent 16 to slightly below the pressure of the intake of compressor 6. Alternately, a polishing compressor (not shown) can be inserted into 21 to force all solvent vapors from 15, 17, and flexible conduits 18 to compressor 6. As needed, to assure removal of all residual solvent when the solvent should not be vented to the atmosphere, a container that can be cooled to well below the boiling point of the solvent can be attached through 20 and be cooled to condense nearly all solvent vapor before disconnecting 15 from the liquid transfer portion of the CEU and, ultimately, removing the spent EM for refilling with EM.

The freshly solvent filled 16 and its equivalents can reside out of the CEU for any desired period of time, where partitioning of the extract from the EM into the solvent to form the extract solution may occur to a large extent before placing 16 into the fluid flow path. In this manner extraction rates are partially or fully decoupled from an equilibrium partitioning of the extract between the EM and the solution while in the fluid flow as the flow of the solvent into the CEU effectively pushes the most concentrated extract solution from the EC immediately after insertion of the EC into the fluid flow. Often the equilibrium extraction is to such a high extent that a single displacement of the solution in the EC renders it to a state where it is ready for solution transfer into an EC with fresh EM. This permits a very high throughput. Even though, as shown in FIGS. 1A and 1B only two ECs are in the flow, the rate at which ECs are removed and replace can be so high that a large number of ECs can be brought to the equilibrium partitioning and be in the que for placement into the flow portion of the CEU.

As in the case of 26, residual solvent vapor over the extract receiver 27 can be connected through three-way valve 28 aligned to an outlet from the EV 25. In this manner, residual solvent is vented from the extract in 27 until it has been sufficiently filled and is ready to be emptied or replaced. At this point, 28 can be aligned to a connected to a container that can be cooled to well below the boiling point of the solvent can be attached through 28 and be cooled to condense nearly all solvent vapor is removed before disconnecting or otherwise emptying 27 from the CEU.

FIG. 1B shows a CEU with a double phase change HE 29 that has a SC 30 consisting of at least one coil, where solvent condenses to a liquid, wrapped around an inner tubular EXC 25, where solvent from the solution evaporates upon passing through an internal EV (not shown). In an embodiment of the invention, the EV can be an at least one adjustable orifice or a fixed orifice such that the EV has a combined cross-sectional area that is a fraction of the cross-section area of the inlet conduit or receiver of the conduit that contacts the EV, where the outside diameter of the EV is nearly the inside diameter of 25, or the EV is situated to promote a revolving liquid flow that allows liquid contact to effectively all of the inside surface of 25. A geometric change in shape of the valve cross-section can be present and allow for a pressure drop with little difference in cross-sectional area to the conduit feeding the EV. The EV can promote a relatively small pressure drop, as long as the exit pressure is sufficiently low to promote evaporation. A fixed orifice EV can have a cross-sectional area that is 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97 98, or 99 percent of the inlet conduit. Flow and the resulting pressure in 25 can be adjusted by a valve 31 prior to the EV and may be adjusted subsequent to the outlet of 25 by valve 32 before the intake of the compressor. The geometry of the EV can be one that forces the solution flow to be directed to the surface for heat exchange with the SC 30 coiling around 25. The HE 29 can be a direct transfer from the wall of the SC coil to a wall of the tubular EXC. The nature of the EV will be further discussed, below. Alternately, the entire HC can be placed in a vessel sealed to the HE such that the vessel can be filled with water or other intermediate fluid that attenuates heat transfer. The intermediate fluid can be agitated or stirred if desired. The balance of the heat from condensation in the SC and the cooling from evaporation in the EXC can maintain a constant temperature that is close to the ambient temperature around the CEU.

As shown in FIG. 1B, a liquid-gas separator (LGS) (22) is situated after the exit from EXC 25. The structure within 22 allows consolidation of any aerosol of extract that exits 25 and allows its return to the consolidated extract exiting the EXC 25. The LGS can have a valve (not shown), for example, but not limited to a float valve or even a narrow tube or other valve with a narrow opening, to allow the draining of fluid extract from 22 with little gas passing from 25. In like manner, LGS (23) can be situated between the output of compressor 6 and SC 30 such that any compressor oil can be separated from the hot compressed gas and passes through a valve through conduit 24 to the compressor. Depending upon the efficiency of the EXC of the HE and the nature of the compressor, LGS 22 and LGS 23 are not necessary in the CEU.

Shown in FIG. 1B is a valve connected to a port (33). In an embodiment of the invention, the valve can be used to control the addition of a second solvent that is non-volatile in the EXC. This can be added when the solute of the first solvent is prone to crystalizing or otherwise solidifying in the EXC. In this manner, the extract is isolated as a solution of the second solvent. This allows the solvent to provide selectivity for solutes and not dissolve solutes that are soluble in the second solvent. The second solvent can be a single compound or a blend of compounds. For example, but not limited to, the solvent can be 1,1,1,2-tetrafluoroethane, and the second solvent can be ethanol, ethyl acetate, or a combination thereof. It should be understood that the particular solvent and second solvent(s) are chosen by the intended extract, although, in general a solvent that is safe for consumption is generally preferable. The second solvent need not be soluble in the solvent. In an embodiment of the invention, the second solvent can be added to the EC, for example, as in FIG. 1B, the second solvent(s) can be 
included with the EM in 16 before transfer of the solvent from 15 to 16. Even if the second solvent is not soluble in the solvent, it can be added prior to solvent transfer, and two different solutions, either mixed or separately based primarily on the solutions' density, can be introduced to the EXC.

Figure 2:
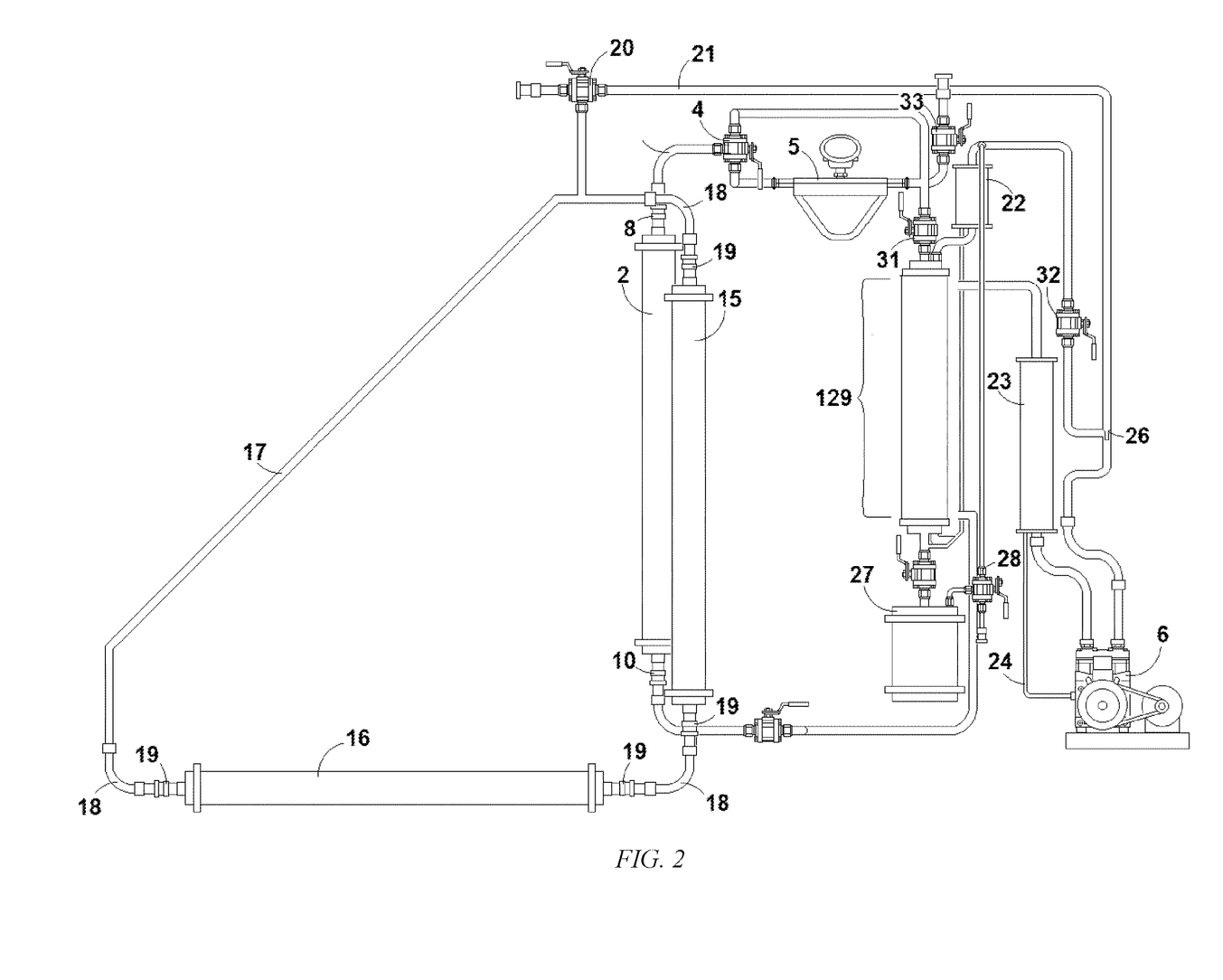
FIG. 2 shows a CEU where the double phase change HE is an EXC tube in a SC tube, according to an embodiment of the invention.

FIG. 2 shows a CEU having an alternative HE 129 where the EXC 125 is similar to that of 25 in FIG. 1B, but the SC consists of a cylindrical containment tube that encases 125. In this embodiment of the invention, the outside wall of 125, a heat exchange surface that is also the inside wall of the SC, can be a much thinner wall. That heat exchange tube's thickness need not be any greater than that which can keep its integrity under the pressure differential of the SC and the EXC 125, which can be quite small, even less than 5 psi. Unlike EXC 25, which externally contacts ambient air and must be sufficiently thick to contain the pressure inherent to an EXC of the CEU, EXC 25 does not need to have a thickness defined by safety factors, as the SC outer tube contains all pressure in HE 129 but does not need to carry out any heat exchange.

Figure 3:
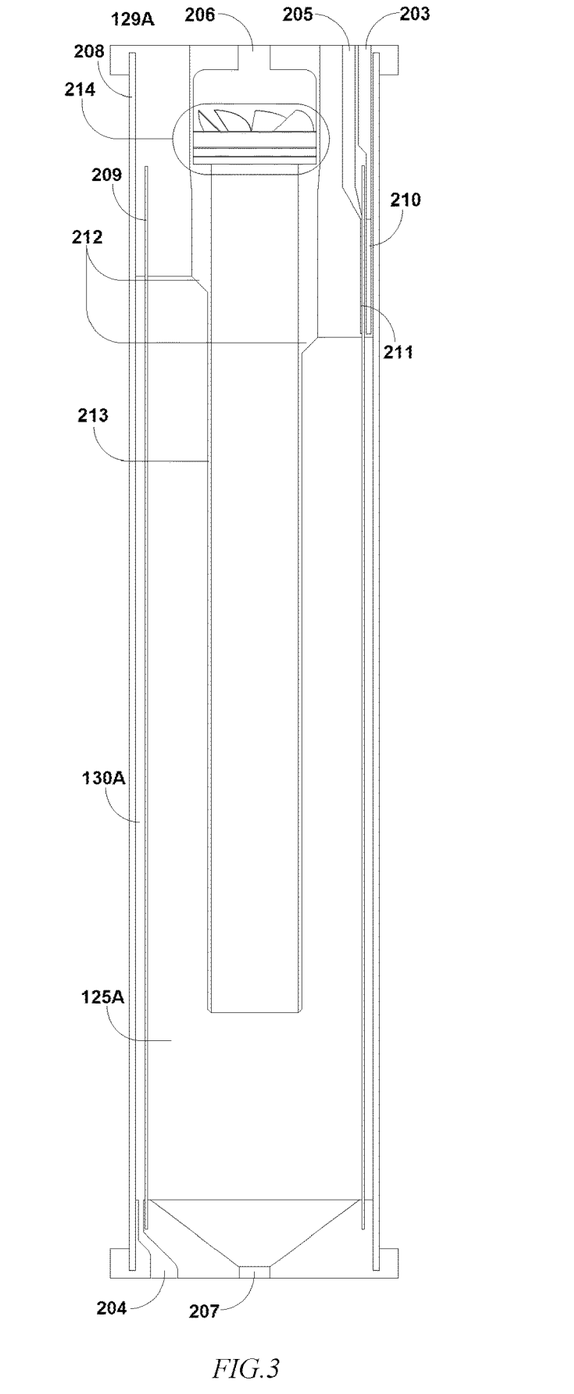
FIG. 3 shows cross-section of a double phase change HE having an EXC with a heat transfer tube shared with a SC having an outer containment tube with a vertical rectangular EV and features for promoting a spiraling flow of extract solution and extract over the entire circumference of the inside of the heat transfer tube, according to an embodiment of the invention.
Figure 4:
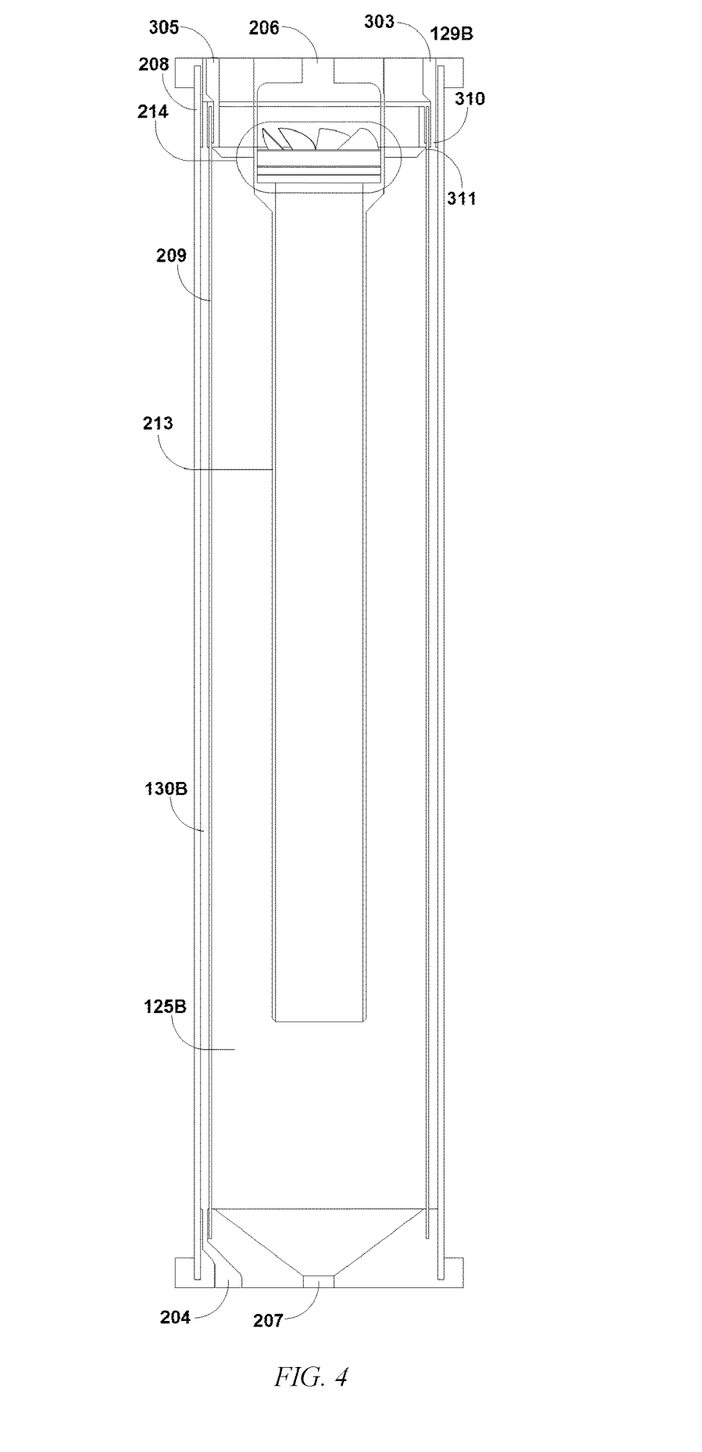
FIG. 4 shows cross-section of a double phase change HE having an EXC with a heat transfer tube shared with a SC having an outer containment tube with a disc EV that has an outside diameter of nearly the diameter of the inside of the heat transfer tube to direct extract solution over the entire circumference of the inside of the heat transfer tube, according to an embodiment of the invention.
Figure 5:
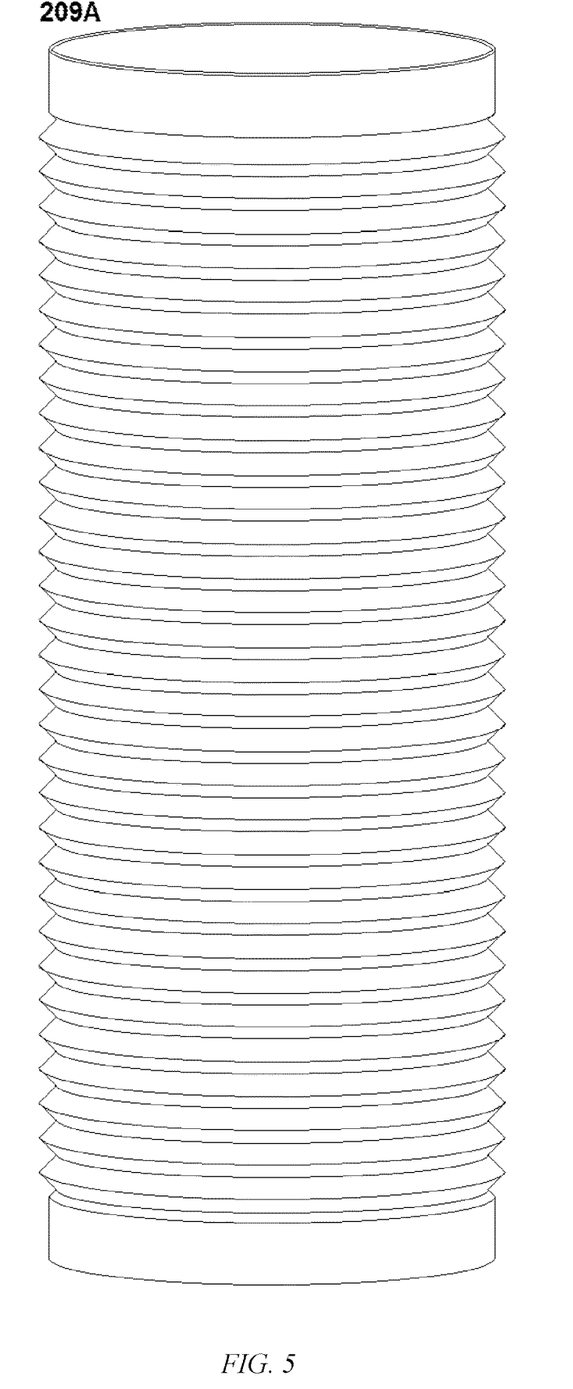
FIG. 5 shows an enhanced surface area heat transfer tube for a double phase change HE having an EXC with a heat transfer tube shared with a SC having an outer containment tube, according to an embodiment of the invention.
Figure 6:
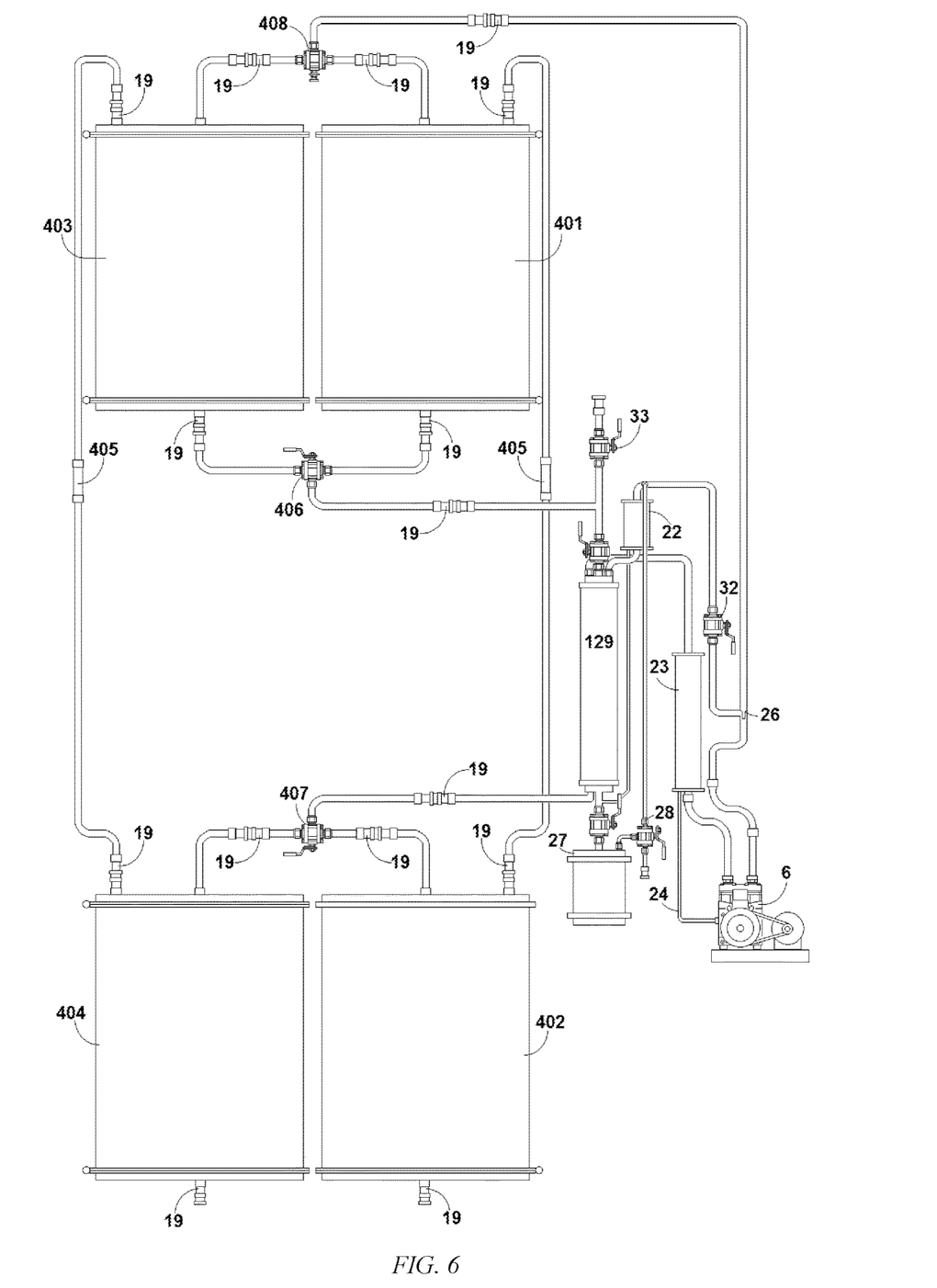
FIG. 6 shows a CEU having two pairs of ECs where the fluid is transferred from an equilibrated extract solution and EM containing EC through an EXC where solvent gas is delivered through a compressor to a SC that delivers solvent to a paired extraction chamber having fresh EM and having less than a complete charge of solvent, with a redundant pair of ECs, one having an equilibrating extract solution and EM and the other in a state of unloading spent EM, reloading fresh EM, and evacuating, according to an embodiment of the invention.

As shown in FIG. 3 for a triple tube double phase change HE 129A, the interior of EXC 125A contains elements for consolidation of extract aerosol (214) that improves liquid-gas separation and elements that increase the effective surface area (212) for heat exchange by directing the liquid flow to spirally flow along the interior of a heat exchange tube (209) of the HE. The entry of hot gas (210) to the SC (130A) and the EV (211) are rectangular in shape and are oriented to be adjacent to and lengthwise aligned with the outer and inner walls of 209. Though not shown, 211 can include a butterfly type valve, or any other valve to adjust the surface area at the valve. Starting at the exit of 211, 212 promotes the solution to spiral down the inner surface of 209 until the concentration of the extract solution or the extract causes it to become sufficiently thick and the liquid has lost its radial momentum and falls effectively downward over 209 till it reaches the extract outlet (207). The gaseous solvent exiting 210 condenses to liquid solvent and drains under pressure through solvent outlet (204) for delivery to the ECs. EXC 125A has an inner tube (213) that allows for the projection of concentrating extract solution aerosol without the aerosols uninhibited transport to 214. The presence of 213 obliges the evaporating gas to be directed downward, projecting aerosol downward toward the extract outlet 207 before the solvent vapors can ascend toward a solvent gas outlet (206) through 214. As 209 may function with a relatively small pressure differential, which can be 10 psi or less to 50 psi or more, between EXC 125A and SC 130A, the thickness can be very thin to promote rapid transfer of the heat of condensation to the EXC 125A. However, the thickness of 209 can be any thickness required to retain its integrity during function with any differential pressure, even up to 100 psi.

FIG. 4 shows an alternative HE triple tube double phase change HE 129B. In EXC 129B there is no equivalent element to 212; however, EV (311), which comprises a disc that is only slightly smaller in diameter than 209, may have decoration on the face of 311 that contains grooves (not shown) that can projection solution in a spiral fashion on the inner surface of 209. EV 311 can be adjustable by including an upper lip (not shown) on 209 above 311 such that drawing 311 upward can effectively decrease the valves cross-sectional area. To increase the surface area of the heat exchange tube in 129A or 129B, 209 can have its surface patterned. For example, but not limited to, alternating an accordion-like decoration heat exchange tube (209A), as in FIG. 5, or otherwise patterned with triangular, square, or hexagonal prisms extending inward and outward from the tube. By increasing the surface area of a heat exchange tube a greater amount of solution can be evaporated and solvent condensed is a given period of time without increasing its diameter. In this manner, larger ECs and compressors can be used without dramatically increasing the outer dimensions of the HE and the overall CEU.

In another embodiment of the invention, the removable and replaceable ECs, which are suitable for handling manually, are substituted with at least four large ECs that are used in pairs, such that a first EC with extract solution where the solute has reach an equilibrium distribution between the EM and solution is passed through the EXC of the HE, with or without the aid of gravity, and the solvent condensed in the SC is drained, with or without the aid of gravity, to a paired second EC. The other pair of ECs comprises a third EC that is in the process of establishing an equilibrium distribution between the EM and solvent and a paired fourth EC that may be in a state of emptying or filling with EM. Three-way valves permit the CEU to have the first pair in a state of flow, while the second is isolated from the flow. When the solution is completely removed from the first EC, two three-way valves are switched such that the third EC, which has reached the equilibrium distribution between the EM and solution, is passed through the EXC of the HE and its paired fourth EC is under vacuum and ready to receive solvent. In this manner, continuous extraction is interrupted only during the period of switching, which may occur in a second or less, or additional valves can be used such that the third EC is placed in service before the first EC is fully drained. Alternately, three or more pairs of ECs can be used such that at least one EC is draining to the EXC of the HE at all times. This is illustrated in FIG. 6.

In FIG. 6, the first pair of ECs (401) and (402) is in a state of extraction where three-way valve (406) is aligned to drain solution from 401 to the EXC of HE 129 to 402 with three-way valve (407) aligned to deliver solvent to 402. A conduit, shown with an optional check valve (405), allows for the gas in 402 to equalize with that of 401. As shown attached to the top of 401 and EC (403), another three-way valve (408) is closed, but can be switched to direct residual gas and vaporizing solvent from 401 to the intake of compressor 6. The other pair of ECs, 403 and (404) resides in the states of coming to equilibrium partitioning of the extract from EM and solution, and being emptied, filled, and evacuated, respectively. In this manner, all manipulations of EM can be carried out in (404) during the time that solution drains from 401. In this embodiment of the invention, like other embodiments of the invention, extract receiver 27 can be replaced with a pump to constantly remove extract from the CEU.

It should be understood that the examples and embodiments described herein are for illustrative purposes only and that various modifications or changes in light thereof will be suggested to persons skilled in the art and are to be included within the spirit and purview of this application.

I claim:

1. A continuous extraction unit (CEU) comprising:

at least one compressor, wherein at least one first compressor is situated to provide fluid flow in a fluid flow portion of the CEU;

a multiplicity of extraction chambers (ECs) comprising quick-disconnect valves at the inlet and outlet of the ECs, wherein at least two ECs containing extractable material EM are mounted in the CEU within a fluid flow portion of the CEU, wherein the quick-disconnect valves permit disconnecting and removing a first EC containing depleted EM and an extract solution in a dilute state from the fluid flow portion while under flow of the CEU and connecting a second EC containing EM and the extract solution in a concentrated state while under flow without loss of the extract solution or a solvent of the extract solution to a surrounding environment during removal of the first EC and replacement with the second EC; and at least one liquid transfer portion of the CEU, wherein the liquid transfer portion comprises: the first EC removed from the fluid flow portion and mounting in the liquid transfer portion; a third EC containing fresh EM and under vacuum; a first conduit configured for connecting the quick-disconnect valve at the outlet of the first EC to the quick-disconnect valve at the inlet of the third EC; and a second conduit configured for connecting the quick-disconnect valve at the outlet of the third EC to the quick-disconnect valve at the inlet of the first EC, wherein the first EC is positioned at an elevation higher than an elevation of the third EC, wherein the first compressor or a second compressor draws a residual solvent gas from the first EC after the liquid transfer to the third EC, wherein the third EC becomes the second EC and is positioned for replacement into the fluid flow portion of the CEU.

2. The continuous extraction unit (CEU) according to claim 1, further comprising at least one double phase change heat exchanger (HE) comprising: a condenser (SC); an expansion chamber (EXC) comprising a heat transfer tube proximal to or shared with the SC; an expansion valve (EV) situated at the top of the heat transfer tube within the EXC and configured to deliver the extract solution to the entire circumference of the heat transfer tube; and a gas outlet path within the EXC that promotes liquid-gas separation by structures for coalescence of an aerosol and separation of the solvent gas from the extract solution and the extract concentrated from the extract solution, wherein the EV has an adjustable or fixed orifice.

3. The continuous extraction unit (CEU) according to claim 1, further comprising a valve connected to a port connected to a source of a second solvent, wherein the second solvent essentially non-volatile at the pressure and temperature of the EXC.

4. The continuous extraction (CEU) according to claim 1, further comprising an information processor interfaced with at least one actuator and/or at least one sensor.

5. The continuous extraction (CEU) according to claim 4, wherein: the information processor comprises a programmed computer; the sensors comprise, independently or in combination, one or more flow meters, fluid density sensors, refractive index detectors, infra-red, visible or ultraviolet light detectors, and/or conductivity detectors; and the actuators comprise, independently or in combination, one or more valves, pumps, and/or alarms.

6. The continuous extraction unit (CEU) according to claim 4, wherein the sensor comprising a Coriolis flow meter.

7. The continuous extraction unit (CEU) according to claim 2, herein the SC comprises coiled tubing proximal to the heat transfer tube of the EXC.

8. The continuous extraction unit (CEU) according to claim 2, wherein the SC comprises an outer containment tube and shares a heat transfer tube of the EXC as the inner surface of the SC and the outer surface of the EXC.

9. The continuous extraction unit (CEU) according to claim 2, wherein the EV comprises the fixed orifice or the adjustable orifice at the top of the EXC, said fixed or adjustable orifice is rectangular or oval in shape with a long dimension perpendicular to the circumference of the heat transfer tube and parallel to the length of the heat transfer tube, and wherein the gas outlet path at the exit of the EV has a spiral geometry for induction of a spiral flow of the extract solution.

10. The continuous extraction unit (CEU) according to claim 2, wherein the EV comprises the fixed orifice or the adjustable orifice at the top of the EXC, said fixed or adjustable orifice in the form of a disc having an outer circumference that is 95 to 99.9 percent of an inner circumference of the heat transfer tube, wherein a solution is discharged between the outer circumference of the disc and the inner circumference of the heat transfer tube, wherein the outer circumference of the EV is featureless for a direct downward discharge of the solution along the inner circumference of the heat exchange tube or the outer circumference is grooved for induction of a spiral flow of solution along the inner circumference of the heat exchange tube.

11. The continuous extraction unit (CEU) according to claim 2, wherein the gas outlet path within the EXC comprises a gas deflection tube within and parallel to the heat transfer tube.

12. The continuous extraction unit (CEU) according to claim 2, wherein the heat transfer tube has a decorated surface to increase the heat transfer tube's surface area.

13. The continuous extraction unit (CEU) according to claim 12, wherein the decorated surface comprise an accordion like series of groves, a series of close packed trigonal pyramids, a series of close packed square pyramids, a series of close packed hexagonal pyramids, a series of close packed hemispheres or any combination thereof.

14. A method of extraction, comprising:
providing an EM;
providing a CEU according to claim 1 comprising:
at least four ECs, wherein the ECs include at least two ECs containing the EM and an extract solution that reside in the fluid flow portion of the CEU, at least one second EC containing the EM and the extract solution in a concentrated state and stationed for placement into the fluid flow portion of the CEU upon removal of a first EC containing the EM and the extract solution in a diluted state or the solvent of the extract solution, and at least one third EC containing the EM under vacuum;
at least one a HE comprising at least one SC and at least one EXC comprising an EV and a gas outlet path that promotes liquid-gas separation; and
at least one compressor;
inducing a flow of the solvent in a liquid state by at least one of the at least one compressor into the first ECs;
flowing the extract solution from the first ECs into the EXC;
separating the solvent as a gas from the extract solution in the EXC;
recirculating the gaseous solvent by introduction to the inlet of at least one of the compressors of the at least one compressor and outputting hot compressed gaseous solvent to the SC where the solvent exiting the SC is directed to at least one of the first ECs;
replacing a spent first EC with a second EC;
placing the spent first EC in the liquid transfer portion of the CEU;
connecting the spent first EC to the third EC;
transferring the solvent as a liquid from the spent first EC to the third EC to form a second EC;
stationing the second EC;

transferring the solvent residual in the liquid transfer portion absent the third EC as a gas to the fluid flow portion of the CEU or to a container for filling the fluid flow portion of the CEU employing the same or another of the at least one compressor of the one of the at least one compressors; and disconnecting the first EC from the liquid transfer portion of the CEU and replacing the spent EM with fresh EM and evacuating to form a third EC.

15. A continuous extraction unit (CEU) comprising:
at least one compressor, wherein at least one first compressor is situated to provide fluid flow in the CEU;
a multiplicity of extraction chambers (ECs) configured in pairs, each of the ECs comprising two-way valves at the inlet and outlet of the ECs, wherein:
   at least one first EC of the at least one first pair of the ECs comprise extractable material (EM) and a concentrated extract solution and at least one second EC of the at least one first pair of the ECs comprise EM, where the first EC of the first pair of ECs is positioned for fluid flow to the first EC of the first pair of ECs: and
   at least one second pair of ECs comprising a first EC of the second pair containing the EM and an extract solution of the solvent and a second EC of the second pair comprising the EM or in a state of removing the EM that is depleted of the extract and replacing with EM that is fresh;
at least one heat exchanger (HE) comprising a condenser (SC) and an expansion chamber (EXC) connected within the CEU to receive the extract solution from the at least one first EC of the at least one first pair of ECs at the EXC and output extract as a neat or concentrated solution, output the solvent as a gas to at least one compressor of the at least one compressor, and input the solvent from the compressor to the SC and output the solvent from the SC to the at least one second EC of the first pair of ECs;
at least one first three-way valve that is positioned and switchable between a first and second position where the first position is to drain at least one of the at least one first ECs of the at least one first pair of ECs with isolation of the at least one of the at least one first ECs of the at least one second pair of ECs and the second position for transforming the at least one first ECs of the at least one second pair of ECs into the at least one first ECs of the at least one first pair of ECs after completion of draining;
at least one second three-way valve positioned and switchable between a first and second position where the first position is to fill at least one of the at least one second ECs of the at least one first pair of ECs with the solvent from the at least one compressor of the at least one compressor with isolation of the at least one of the at least one second ECs of the at least one second pair of ECs and the second position is for transforming the at least one second ECs of the at least one second pair of ECs into the at least one second ECs of the at least one first pair of ECs upon completion of draining;
at least one third three-way valve positioned and switchable between a first and second position where the first position is a closed position during the draining of the at least one of the at least one first ECs of the at least one first pair of ECs and as second position that is open between the at least one first ECs of the at least one first pair of ECs and at least one compressor of the at least one compressor to remove the solvent residual in the at least one first ECs of the at least one first pair of ECs after effectively completion of draining; and
at least one pump or at least one valve for continuously or periodically removing the extract from the EXC without disruption of the fluid flow.

16. A continuous extraction unit (CEU) according to claim 15, further comprising a valve connected to a port connected to a source of a second solvent, wherein the second solvent essentially non-volatile at the pressure and temperature of the EXC.

17. The continuous extraction (CEU) according to claim 15, further comprising an information processor interfaced with at least one actuator and/or at least one sensor.

18. The continuous extraction (CEU) according to claim 17, wherein: the information processor comprises a programmed computer; the sensors comprise, independently or in combination, one or more flow meters, fluid density sensors, refractive index detectors, infra-red, visible or ultra-violet light detectors, and/or conductivity detectors; and the actuators comprise, independently or in combination, one or more valves, pumps, and/or alarms.

19. A method of extraction, comprising:
providing an EM;
providing a CEU according to claim 16 comprising:
   at least one first EC of the at least one first pair of the ECs comprise extractable material (EM) and a concentrated extract solution and at least one second EC of the at least one first pair of the ECs comprise EM, where the first EC of the first pair of ECs is positioned for fluid flow to the first EC of the first pair of ECs:
   at least one second pair of ECs comprising a first EC of the second pair containing the EM and an extract solution of the solvent and a second EC of the second pair comprising the EM or in a state of removing the EM that is depleted of the extract and replacing with EM that is fresh;
   at least one first three-way valve that is positioned and switchable between a first and second position where the first position is to drain at least one of the at least one first ECs of the at least one first pair of ECs with isolation of the at least one of the at least one first ECs of the at least one second pair of ECs and the second position for transforming the at least one first ECs of the at least one second pair of ECs into the at least one first ECs of the at least one first pair of ECs after completion of draining;
   at least one second three-way valve positioned and switchable between a first and second position where the first position is to fill at least one of the at least one second ECs of the at least one first pair of ECs with the solvent from the at least one compressor of the at least one compressor with isolation of the at least one of the at least one second ECs of the at least one second pair of ECs and the second position is for transforming the at least one second ECs of the at least one second pair of ECs into the at least one second ECs of the at least one first pair of ECs upon completion of draining;
   at least one third three-way valve positioned and switchable between a first and second position where the first position is a closed position during the draining of the at least one of the at least one first ECs of the at least one first pair of ECs and as second position that is open between the at least one first ECs of the at least one first pair of ECs and at least one compressor of the at least one compressor to remove the solvent residual in the at least one first ECs of the at least one first pair of ECs after effectively completion of draining;

at least one a HE comprising at least one SC and at least one EXC;

at least one pump or at least one valve for continuously or periodically removing the extract from the EXC without disruption of the fluid flow at least one compressor;

draining the concentrated extract solution from the at least one first EC of the at least one first pair of the ECs to the EXC and flow of the solvent in a liquid state by at least one of the at least one compressor into the at least one second EC of the at least one first pair of the ECs;

separating the solvent as a gas from the extract solution in the EXC;

switching the at least one first three-way valve, the at least one second three-way valve; and the at least one third three-way valve for:

transforming the at least one first ECs of the at least one second pair of ECs into at least one first ECs of the at least one first pair of ECs after completion of draining;

transforming the at least one second ECs of the at least one second pair of ECs into at least one first ECs of the at least one first pair of ECs after completion of draining;

removing the solvent residual in the at least one first ECs of the at least one first pair of ECs after completion of draining to form a solvent free EC with spent EM;

disconnecting the at least one second EC of the at least one first pair of ECs that is paired with the solvent free EC with spent EM and connecting it as the at least one first EC of the at least one second pair of EC;

disconnecting the solvent free EC with spent EM and:

connecting it as the at least one second EC of the at least one second pair of EC;

removing the spent EM form the at least one second EC of the at least one second pair of EC; and filling the at least one second EC of the at least one second pair of EC with fresh EM; and removing the extract from the EXC with least one pump or at least one valve at the base of the EXC in a continuous or periodic manner.

20. A continuous extraction unit (CEU) according to claim 15, wherein at least one of the at least one HE is a double phase change heat exchanger (HE) comprising: a heat transfer tube proximal to or shared with the SC; an expansion valve (EV) situated at the top of the heat transfer tube within the EXC and configured to deliver the extract solution to the entire circumference of the heat transfer tube; and a gas outlet path within the EXC that promotes liquid-gas separation by structures for coalescence of an aerosol and separation of the solvent gas from the extract solution and the extract concentrated from the extract solution, wherein the EV has an adjustable or fixed orifice.

* * * * *